United States Patent [19]

Halberstein

[11] 3,916,353

[45] Oct. 28, 1975

[54] ELECTRICALLY CONTROLLABLE MICROWAVE BIPOLAR ATTENUATOR

[75] Inventor: Joseph H. Halberstein, Fredericksburg, Va.

[73] Assignee: The United States of America as represented by the Secretary of the Navy, Washington, D.C.

[22] Filed: Mar. 27, 1972

[21] Appl. No.: 238,674

[52] U.S. Cl. .......... 333/81 R

[51] Int. Cl.² .......... H01P 1/22

[58] Field of Search .......... 333/81 R

[56] References Cited

UNITED STATES PATENTS

| | | | |
|---|---|---|---|
| 3,323,080 | 5/1967 | Schwelb et al. | 333/81 R X |
| 3,522,556 | 8/1970 | Ragan | 333/81 R X |
| 3,601,718 | 8/1971 | Arnesen | 333/81 R |
| 3,631,333 | 12/1971 | Pichal | 333/81 R X |
| 3,652,959 | 3/1973 | Denny | 333/81 R |

*Primary Examiner*—T. H. Tubbesing

[57] ABSTRACT

An attenuator which permits manual or electrical control of both amplitude and polarity of a microwave frequency output signal and is referred to throughout this specification as a bipolar attenuator. The input microwave signal is divided with one signal passing through a variable attenuator while the other signal passes through a variable attenuator and a phaseshifter. The phaseshifter provides exact opposition in phase such that when the two signals are equal in amplitude, the output is zero when they are recombined. As the amplitude of one signal changes, the output decreases to zero and increases again with reversed polarity. Two bipolar attenuators in combination with another phaseshifter, a power divider and a power combiner provide 360° phase control.

3 Claims, 2 Drawing Figures

ELECTRICALLY CONTROLLABLE MICROWAVE BIPOLAR ATTENUATOR

BACKGROUND OF THE INVENTION

The present invention relates generally to signal attenuators and more particularly to microwave signal attenuators which provide full control of the polarity phase and amplitude of the signal.

The control of the amplitude of a microwave signal is conventionally accomplished by means of mechanical tuning devices, variable coupling loops or ferrite attenuators. These devices all have non-linear attenuation characteristics and display reactive characteristics which introduce undesirable phase variations into the signal. They are difficult to tune or calibrate accurately, slow in response and physically large and unwieldy. There has recently been developed signal attenuators which use a voltage or current controlled PIN diode to provide variable attenuation. It is this type of attenuator that is used in the present invention.

SUMMARY OF THE INVENTION

The present invention relates to a bipolar attenuator for controlling the attenuation of a microwave signal over a large range of amplitude and both polarities. The signal to be controlled is divided into two portions with one portion passing through an attenuator and the other portion passing through a variable attenuator and a phaseshifter. The variable attenuator is of the well known DC voltage controlled PIN diode type. When the two portions are recombined, the amplitude and polarity of the resulting signal depends on the setting of the PIN attenuator. By combining two bipolar attenuators, 360° phase control is attained.

OBJECTS OF THE INVENTION

An object of the present invention is to provide a bipolar attenuator which controls a microwave signal as to amplitude, polarity and/or phase by means of a DC signal.

Another object of the present invention is to provide a microwave signal attenuator with 360° phase control.

A further object of the invention is to provide a DC controlled microwave bipolar attenuator using only one PIN diode.

Still another object of the invention is to provide a DC controlled microwave attenuator that achieves 360° phase control with only two PIN diodes.

Other objects, advantages and novel features of the present invention will become apparent from the following detailed description of the invention when considered in conjunction with the accompanying drawings.

DESCRIPTION OF THE PREFERRED EMBODIMENT

Figure 1:
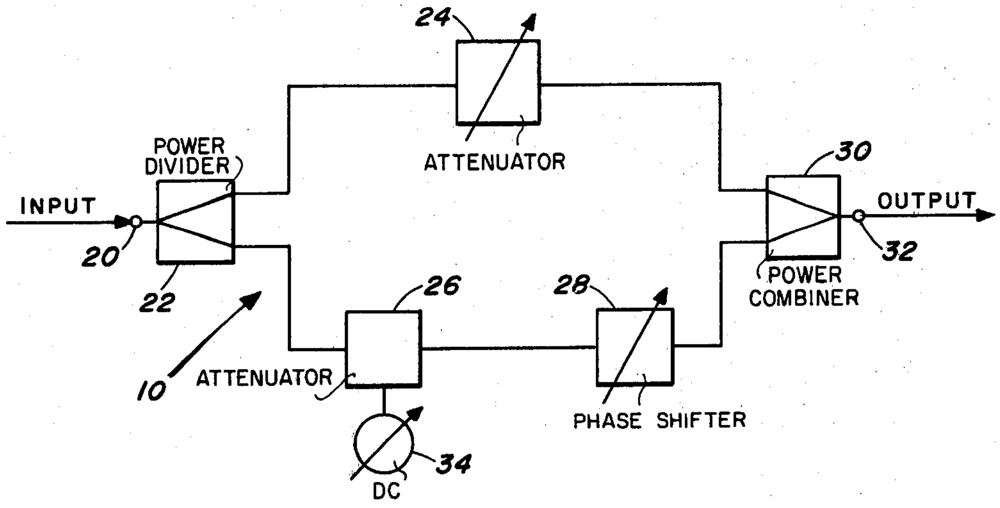
FIG. 1 shows the bipolar attenuator in block diagram form.

Referring to FIG. 1, the bipolar attenuator comprises a microwave power divider 22, such as a hybrid T, an attenuator 24 which may be fixed or manually variable, an electrically controllable attenuator 26, such as a PIN diode, attenuator variable DC source 34, phaseshifter 28 and a microwave power combiner 30 such as a hybrid T.

The operation of the bipolar attenuator will now be described. The microwave signal to be attenuated is received at terminal 20 of hybrid T 22 which divides the signal into two portions in the well known manner. The attenuator 24 is set (either by prior design, if a fixed attenuator is used, or by manual adjustment) to a value which is approximately the center of the range of electrically controllable attenuator 26. Phaseshifter 28 is adjusted such that its output signal is 180° out of phase with the signal out of attenuator 24, the two inputs to 30 being in exact phase opposition. By using an adjustable phaseshifter compensation can be made for any phaseshift introduced by the electrically controlled attenuator. Of course, it is contemplated that during the actual use of the invention the attenuator 24 and phaseshifter 28 will remain constant, having previously been adjusted to the desired values. Thus a first portion of the split signal is attenuated a predetermined amount by attenuator 24. The second portion of the signal is attenuated by electrically controllable attenuator 26 to a degree determined by the DC source 34. When electrically controlled attenuator 26 receives a control signal such that its output signal magnitude is exactly equal to the magnitude of the output signal of attenuator 24, the signals entering hybrid T 30 will be equal but 180° out of phase. Thus the output of 30 will be zero and the bipolar attenuator is considered balanced. When attenuator 26 attenuates its signal more than does attenuator 24, the signal entering 30 from attenuator 24 will be greater in magnitude than the signal from phase-shifter 28 and there will be an output signal from 30 which is in phase with the original input signal at terminal 20. When attenuator 26 attenuates its signal less than does attenuator 24 the output signal from 30 will be 180° out of phase, i.e., of opposite polarity with the input signal at terminal 20. Thus, when the DC control signal from DC source 34 is varied continuously over a range which changes the attenuation of 26 from a small to a high value, passing through the balanced condition, the output signal of hybrid T 30 will vary continuously from a negative magnitude to a positive magnitude by way of zero.

Figure 2:
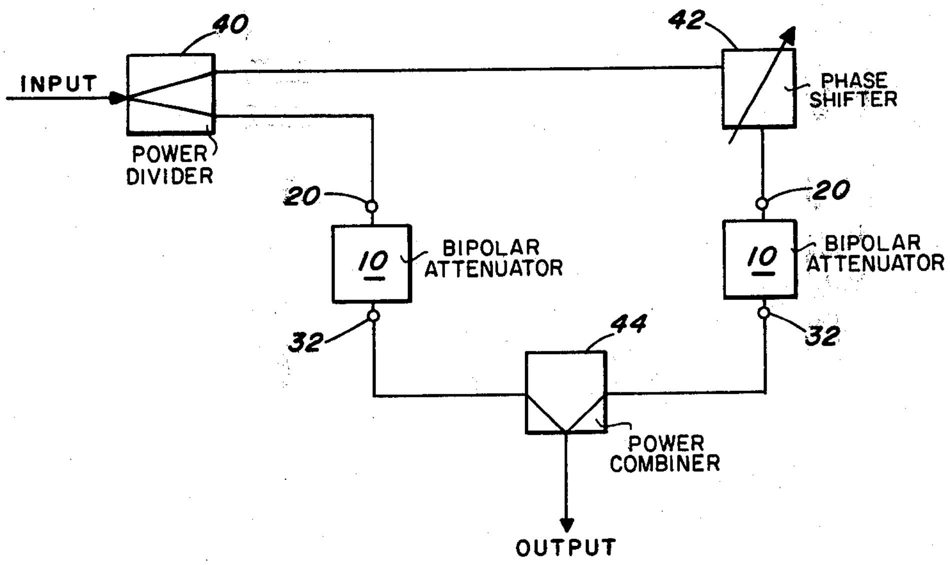
FIG. 2 shows, in block diagram form, an attenuator providing 360° phase control.

Shown in FIG. 2 is an attenuator device using a pair of the bipolar attenuators to attain 360° phase control. The signal to be attenuated is divided into two portions by power divider 40. A first portion is phaseshifted by phase-shifter 42 so that the two microwave components which are added in power combiner 44 are in phase quadrature. The bipolar attenuators 10, (as shown in detail in FIG. 1), generate signals which can be varied in amplitude and sign along the two phase quadrature axis by varying their D.C. inputs. In the power combiner two signals are added vectorially, the magnitude of which can be controlled by the D.C. sources to form an output from power combiner 44 of arbitrary attenuation and phase. If manual control rather than electrical control is desired the electrically controllable bipolar attenuators 10 can be replaced by mechanically controllable bipolar attenuators.

Obviously, many modifications and variations of the present invention are possible in light of the above teachings. It is therefore to be understood that, within the scope of the appended claims, the invention may be practiced otherwise than as specifically described.

What is claimed is:

1. An electrically controllable microwave attenuator device for providing 360° phase control which comprises:

first microwave power dividing means for receiving a microwave signal and dividing it into a first portion and a second portion;

phase shifting means connected to the power dividing means for receiving and phase shifting said first signal portion;

a first bipolar attenuator connected to said phase shifting means;

a second bipolar attenuator connected to said power dividing means for receiving said second signal portion; and, microwave power combining means connected to said first and second bipolar attenuators.

2. The device of claim 1 wherein each bipolar attenuator includes:

a hybrid T power divider for receiving a microwave signal and providing first and second outputs;

a manually variable attenuator connected to the first output;

a DC controlled PIN diode attenuator connected to the second output;

a phase shifter connected to the PIN diode attenuator; and, a hybrid T power combiner connected to the phase shifter and the manually variable attenuator.

3. The device of claim 2 wherein the manually variable attenuator is preset to a value within the range of the DC controlled PIN diode attenuator.

* * * * *